US012590899B2

(12) United States Patent
Fushida et al.

(10) Patent No.: US 12,590,899 B2
(45) Date of Patent: Mar. 31, 2026

(54) MEASURING DEVICE AND SELECTION DEVICE

(71) Applicant: SATAKE CORPORATION, Tokyo (JP)

(72) Inventors: Shinya Fushida, Tokyo (JP); Hiroaki Takeuchi, Tokyo (JP)

(73) Assignee: SATAKE CORPORATION, Tokyo (JP)

( * ) Notice: Subject to any disclaimer, the term of this patent is extended or adjusted under 35 U.S.C. 154(b) by 0 days.

(21) Appl. No.: 18/846,753

(22) PCT Filed: Mar. 13, 2023

(86) PCT No.: PCT/JP2023/009530
§ 371 (c)(1),
(2) Date: Sep. 13, 2024

(87) PCT Pub. No.: WO2023/176751
PCT Pub. Date: Sep. 21, 2023

(65) Prior Publication Data
US 2025/0198939 A1     Jun. 19, 2025

(30) Foreign Application Priority Data
Mar. 16, 2022     (JP) ................................. 2022-041545

(51) Int. Cl.
| *G01N 21/85* | (2006.01) |
| *B07C 5/342* | (2006.01) |
| *G01N 21/359* | (2014.01) |

(52) U.S. Cl.
CPC ........... *G01N 21/85* (2013.01); *B07C 5/3425* (2013.01); *G01N 21/359* (2013.01); *G01N 2021/8592* (2013.01)

(58) Field of Classification Search
CPC ................. G01N 21/85; G01N 21/359; G01N 2021/8592; B07C 5/3425
(Continued)

(56) References Cited

U.S. PATENT DOCUMENTS

| 6,130,743 | A | * | 10/2000 | Copeland | ............... | G01N 15/05 |
| | | | | | | 356/39 |
| 2023/0009210 | A1 | | 1/2023 | Miyamoto | | |
| 2025/0198939 | A1 | * | 6/2025 | Fushida | ................. | B07C 5/342 |

FOREIGN PATENT DOCUMENTS

| CN | 102713567 | A | * | 10/2012 | ........... | G06V 10/143 |
| JP | H10202204 | A | | 8/1998 | | |
(Continued)

OTHER PUBLICATIONS

International Search Report corresponding to International Application No. PCT/JP2023/009530, mailed Apr. 18, 2023, with English translation.
(Continued)

*Primary Examiner* — Terrell H Matthews
(74) *Attorney, Agent, or Firm* — Renner, Otto, Boisselle & Sklar, LLP.

(57) ABSTRACT

A measurement apparatus includes an electromagnetic wave irradiation source, a sensor, a discrimination portion configured to discriminate the condition of the target based on a signal acquired by the sensor, and an irradiation control portion. The electromagnetic wave irradiation source includes a first irradiation source and a second irradiation source different from each other in at least one of a wavelength range of the electromagnetic wave emitted therefrom and an installation position thereof. The irradiation control portion is configured to control the electromagnetic wave irradiation source in such a manner that a first irradiation period and a second irradiation period do not overlap each other and occur alternately. The first irradiation period is a
(Continued)

period during which the first irradiation source emits the electromagnetic wave. The second irradiation period is a period during which the second irradiation source emits the electromagnetic wave.

14 Claims, 12 Drawing Sheets

(58) Field of Classification Search
USPC .......................................................... 209/580
See application file for complete search history.

(56) References Cited

FOREIGN PATENT DOCUMENTS

| | | | | | |
|---|---|---|---|---|---|
| JP | 2010042326 | A | | 2/2010 | |
| JP | 2016197065 | A | * | 11/2016 | ............. G01N 21/88 |
| JP | 2020085622 | A | * | 6/2020 | |
| JP | 2021085846 | A | * | 6/2021 | ............. B07C 5/342 |
| JP | 2021090934 | A | | 6/2021 | |
| WO | WO-2023176751 | A1 | * | 9/2023 | ......... G01N 21/3151 |

OTHER PUBLICATIONS

Written Opinion corresponding to International Application No. PCT/JP2023/009530, mailed Apr. 18, 2023, in Japanese language only.
International Preliminary Report on Patentability for corresponding Application No. PCT/JP2023/009530 issued Sep. 10, 2024.
Office Action issued for corresponding Japanese National Phase Application No. 2022041545A, mailed Sep. 30, 2025.

* cited by examiner

FIG. 1

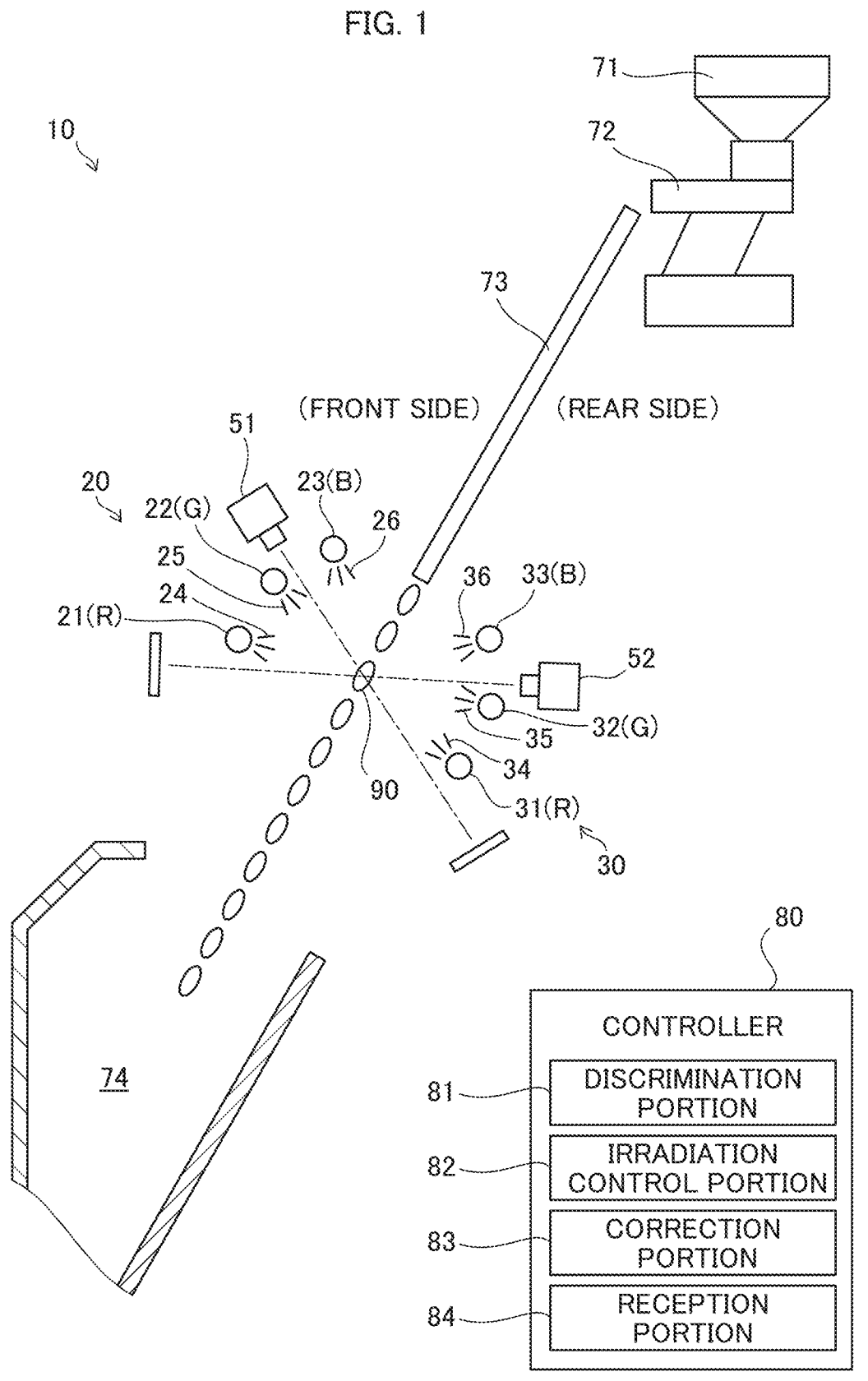

(FRONT SIDE)  (REAR SIDE)

CONTROLLER

DISCRIMINATION PORTION

IRRADIATION CONTROL PORTION

CORRECTION PORTION

RECEPTION PORTION

| LIGHT SOURCE | SCAN NUMBER | 1 | 2 | 3 | 4 | 5 | 6 | 7 | 8 |
|---|---|---|---|---|---|---|---|---|---|
| FRONT | R, G, B | ON | | | | | | | |
| | NIR | OFF | | | | | | | |
| REAR | R, G, B | | | | | | | | |
| | NIR | | | | | | | | |

MEASURING DEVICE AND SELECTION DEVICE

This application is a national phase of International Application No. PCT/JP2023/009530 filed Mar. 13, 2023, which claims priority to Japan Application No. 2022-041545 filed Mar. 16, 2022, each of which is hereby incorporated herein by reference in its entirety.

TECHNICAL FIELD

The present invention relates to an optical measurement technique.

BACKGROUND

Conventionally, there have been known optical sorters (hereinafter also simply referred to as sorters) configured to discriminate and remove a foreign object and a defective product contained in sorting targets using light information acquired by an optical sensor when irradiating the sorting targets with light from a light source. In this type of sorters, the light information acquired by the optical sensor (for example, a color tone value) is compared with a threshold value, and the condition of each of the sorting targets (whether it is an acceptable product or a foreign object/defective product) is discriminated based on a result of this comparison.

For example, Japanese Patent Application Laid-Open No. 2010-42326 discloses a sorter in which red, green, and blue light sources are disposed on one side of a conveyance route of a sorting target, and green and blue light sources are disposed on the other side. According to this sorter, for example, whether or not a rice grain set as the sorting target is chalky rice can be discriminated based on a result of detection of reflected light and transmitted light generated from light emitted from the red light source.

SUMMARY OF INVENTION

Technical Problem

However, the above-described sorter can determine only limited types of conditions of the sorting target. This has led to a demand for increasing discriminable types of conditions without reducing the discrimination accuracy. This demand is not limited to when the sorting target is rice, and is applied in common when the sorting target is any granular object. Further, this demand is not limited to the sorter, and is also applied in common to a measurement apparatus for measuring a condition of a target.

Solution to Problem

The present disclosure has been made to solve at least a part of the above-described problem, and can be realized as, for example, the following aspects.

According to a first aspect of the present disclosure, a measurement apparatus for measuring a condition of a target is provided. This measurement apparatus includes a conveyance portion configured to convey the target, an electromagnetic wave irradiation source configured to irradiate the target in transit due to an action of the conveyance portion with an electromagnetic wave, a sensor configured to detect at least one of a reflected electromagnetic wave emitted from the electromagnetic wave irradiation source and reflected on the target and a transmitted electromagnetic wave emitted from the electromagnetic wave irradiation source and transmitted through the target, a discrimination portion configured to discriminate the condition of the target based on a signal acquired by the sensor, and an irradiation control portion configured to control the irradiation with the electromagnetic wave emitted from the electromagnetic wave irradiation source. The electromagnetic wave irradiation source includes a first irradiation source and a second irradiation source different from each other in at least one of a wavelength range of the electromagnetic wave emitted therefrom and an installation position thereof. The irradiation control portion is configured to control the electromagnetic wave irradiation source in such a manner that a first irradiation period and a second irradiation period do not overlap each other and occur alternately. The first irradiation period is a period during which the first irradiation source emits the electromagnetic wave. The second irradiation period is a period during which the second irradiation source emits the electromagnetic wave. "The target in transit due to an action of the conveyance portion" includes, for example, the target being conveyed on the conveyance portion and the target falling from the conveyance portion.

Herein, the first irradiation period and the second irradiation period are described as "alternately" occur, which is intended to refer to the occurrence of the first irradiation period and the second irradiation period when focusing on the first irradiation period and the second irradiation period. Therefore, when the electromagnetic wave irradiation source includes another irradiation period besides the first irradiation period and the second irradiation period, another irradiation period may be interposed between the first irradiation period and the second irradiation period. One example of the pattern in which the first irradiation period and the second irradiation period "alternately" occur is such a pattern that the electromagnetic wave irradiation source includes the first irradiation period, the second irradiation period, and a third irradiation period, and the first irradiation period, the second irradiation period, and the third irradiation period occur in the following order: the first irradiation period, the third irradiation period, the second irradiation period, the first irradiation period, the third irradiation period, and the second irradiation period. Another example of the pattern in which the first irradiation period and the second irradiation period "alternately" occur is such a pattern that the first irradiation period, the second irradiation period, and the third irradiation period occur in the following order: the first irradiation period, the second irradiation period, the first irradiation period, the third irradiation period, and the second irradiation period. The wavelength range of each of the first irradiation source and the second irradiation source can be set in any manner. For example, each of the first irradiation source and the second irradiation source may emit visible light. Alternatively, each of the first irradiation source and the second irradiation source may emit near-infrared light. Alternatively, one of the first irradiation source and the second irradiation source may emit visible light, and the other of the first irradiation source and the second irradiation source may emit near-infrared light.

According to this measurement apparatus, with respect to each of the electromagnetic waves emitted from the first irradiation source and the second irradiation source different from each other in at least one of the wavelength range and the installation position, at least one of the reflected electromagnetic wave and the transmitted electromagnetic wave can be detected. Therefore, a larger number of types of conditions can be discriminated by the discrimination portion. In addition, the first irradiation period and the second irradiation period do not overlap each other, and therefore interference is prevented between the electromagnetic waves respectively emitted from the first irradiation source and the second irradiation source. Further, the first irradiation period and the second irradiation period alternately occur, and therefore at least one of the reflected electromagnetic wave and the transmitted electromagnetic wave can be acquired at sufficient resolution during both the first irradiation period and the second irradiation period. Therefore, the accuracy of discriminating the condition of the target can be excellently ensured.

According to a second aspect of the present disclosure, in the first aspect, the first irradiation source is disposed on a first side with respect to a conveyance route of the target. The second irradiation source is disposed on a second side opposite from the first side. The sensor includes a first sensor disposed on the first side and a second sensor disposed on the second side. According to this aspect, four types of electromagnetic waves, i.e., the reflected electromagnetic wave and the transmitted electromagnetic wave based on the electromagnetic wave emitted from the first irradiation source, and the reflected electromagnetic wave and the transmitted electromagnetic wave based on the electromagnetic wave emitted from the second irradiation source can be acquired.

According to a third aspect of the present disclosure, in the first or second aspect, the irradiation control portion is configured to control the electromagnetic wave irradiation source in such a manner that a non-irradiation period, during which the electromagnetic wave is not emitted from the electromagnetic wave irradiation source, is interposed between the first irradiation period and the second irradiation period. According to this aspect, the electromagnetic wave emitted from the first irradiation source and the electromagnetic wave emitted from the second irradiation source can be easily prevented from being detected by the sensor in an interfering state. Therefore, the reflected electromagnetic wave and/or the transmitted electromagnetic wave can be detected more accurately, and thus the accuracy of discriminating the condition of the target can be improved.

According to a fourth aspect of the present disclosure, in any of the first to third aspects, each of the first irradiation source and the second irradiation source is configured to emit visible light. The electromagnetic wave irradiation source includes a third irradiation source and a fourth irradiation source configured to emit near-infrared light. The third irradiation source and the fourth irradiation source are different from each other in at least one of a wavelength range of the near-infrared light emitted therefrom and an installation position thereof. The irradiation control portion is further configured to control the electromagnetic wave irradiation source in such a manner that a third irradiation period and a fourth irradiation period do not overlap each other and occur alternately. The third irradiation period is a period during which the third irradiation source emits the near-infrared light. The fourth irradiation period is a period during which the fourth irradiation source emits the near-infrared light. According to this aspect, at least one of the reflected electromagnetic wave and the transmitted electromagnetic wave based on the visible light emitted from each of the first irradiation source and the second irradiation source, and at least one of the reflected electromagnetic wave and the transmitted electromagnetic wave based on the near-infrared light in each of the two kinds of wavelength ranges can be detected. Therefore, a further larger number of types of conditions can be discriminated by the discrimination portion. Further, the third irradiation period and the fourth irradiation period do not overlap each other, which can prevent interference between the near-infrared light beams respectively emitted from the third irradiation source and the fourth irradiation source, thereby excellently ensuring the accuracy of discriminating the condition of the target.

According to a fifth aspect of the present disclosure, in any of the first to fourth aspects, at least one of the first irradiation source and the second irradiation source is configured to emit at least an electromagnetic wave in a first wavelength range and an electromagnetic wave in a second wavelength range different from the first wavelength range. The sensor includes an element sensitive to both the first wavelength range and the second wavelength range. The measurement apparatus includes a correction portion configured to make a correction for reducing an intensity of a signal acquired by the element. The discrimination portion discriminates the condition of the target based on the intensity of the signal after the correction. According to this aspect, even when a result of detection of one of the electromagnetic wave in the first wavelength range and the electromagnetic wave in the second wavelength range is affected by superimposition of the other of them thereon as noise due to the sensor including the element sensitive to both the first wavelength range and the second wavelength range, the influence of this superimposed noise can be corrected. Therefore, the accuracy of discriminating the condition of the target can be further improved.

According to a sixth aspect of the present disclosure, a sorting apparatus is provided. This sorting apparatus includes the measurement apparatus according to any one of the first to fifth aspects, and a sorting portion configured to sort the target based on a result of the discrimination made by the discrimination portion. According to this sorting apparatus, a larger number of types of conditions of the target can be sorted by the sorting apparatus. Alternatively, the condition of the target can be confirmed in further detail by outputting a result of the discrimination made by the discrimination portion.

According to a seventh aspect of the present disclosure, in the fifth aspect, the measurement apparatus includes a reception portion configured to receive a kind of the target that should be measured by the measurement apparatus. The correction portion is configured to change a level of the correction according to the kind of the target received by the reception portion. The optical characteristic of the target varies depending on the kind thereof. Therefore, according to this aspect, the influence of the above-described superimposed noise can be further accurately corrected according to the kind of the target.

According to an eighth aspect of the present disclosure, in the fifth or seventh aspect, the correction portion is configured to change the level of the correction according to the intensity of the signal acquired by the element. The optical characteristic of the target varies depending on the condition thereof. Therefore, according to this aspect, the influence of the above-described superimposed noise can be further accurately corrected according to the condition of the target.

According to a ninth aspect of the present disclosure, in any of the first to fifth aspects, the seventh aspect, and the eighth aspect, each of the first irradiation source and the second irradiation source is configured to emit green light. According to this aspect, the condition of the target can be discriminated in detail based on at least one of reflected light and transmitted light of the green light. For example, in a case where the target is rice, a green immature grain and a white immature grain, green dead rice and white dead rice, a green immature grain and green dead rice, and a white immature grain and white dead rice can be accurately discriminated from each other.

According to a tenth aspect of the present disclosure, in any of the first to fifth aspects and the seventh to ninth aspects, each of the first irradiation source and the second irradiation source is configured to emit blue light. According to this aspect, the condition of the target can be discriminated in detail based on at least one of reflected light and transmitted light of the blue light. For example, in the case where the target is rice, a green immature grain and a white immature grain, green dead rice and white dead rice, a green immature grain and green dead rice, and a white immature grain and white dead rice can be accurately discriminated from each other.

According to an eleventh aspect of the present disclosure, in any of the first to third aspects, the fifth aspect not dependent from the fourth aspect, and the seventh to tenth aspects not dependent from the fourth aspect, each of the first irradiation source and the second irradiation source is configured to emit visible light. The electromagnetic wave irradiation source includes a third irradiation source configured to emit near-infrared light. The irradiation control portion is configured to control the electromagnetic wave irradiation source in such a manner that the first irradiation period, the second irradiation period, and a third irradiation period, during which the third irradiation source emits the near-infrared light, do not overlap each other. According to this aspect, at least one of the reflected electromagnetic wave and the transmitted electromagnetic wave based on the visible light emitted from each of the first irradiation source and the second irradiation source, and at least one of the reflected electromagnetic wave and the transmitted electromagnetic wave based on the near-infrared light can be detected. Therefore, a further larger number of types of conditions can be discriminated by the discrimination portion. Further, the first to third irradiation periods do not overlap each other, which can prevent interference between the electromagnetic waves respectively emitted from the first to third irradiation sources, thereby excellently ensuring the accuracy of discriminating the condition of the target.

According to a twelfth aspect of the present disclosure, in any of the first to fifth aspects and the seventh to eleventh aspects, the conveyance portion is in the form of a chute or a conveyor. In other words, the conveyance portion has a width that allows a plurality of targets to be arranged in a direction perpendicular to a conveyance direction of the target that is being conveyed. According to this aspect, a large number of targets can be conveyed all at once. Therefore, the measurement apparatus can be equipped with high processing capability per time.

According to a thirteenth aspect of the present disclosure, a sorting apparatus is provided. This sorting apparatus includes the measurement apparatus according to any of the seventh to twelfth aspects, and a sorting portion configured to sort the target based on a result of the discrimination made by the discrimination portion.

According to a fourteenth aspect of the present disclosure, a measurement apparatus for measuring a condition of a target is provided. This measurement apparatus includes a conveyance portion configured to convey the target, an electromagnetic wave irradiation source configured to irradiate the target in transit due to an action of the conveyance portion with an electromagnetic wave, a sensor configured to detect the electromagnetic wave emitted from the electromagnetic wave source and associated with the target, and a discrimination portion configured to discriminate the condition of the target based on a signal acquired by the sensor. The electromagnetic wave irradiation source is configured to emit at least an electromagnetic wave in a first wavelength range and an electromagnetic wave in a second wavelength range different from the first wavelength range. The sensor includes an element sensitive to both the first wavelength range and the second wavelength range. The measurement apparatus further includes a correction portion configured to make a correction for reducing an intensity of a signal acquired by the element. The discrimination portion discriminates the condition of the target based on the intensity of the signal after the correction. According to this measurement apparatus, even when a result of detection of one of the electromagnetic wave in the first wavelength range and the electromagnetic wave in the second wavelength range is affected by superimposition of the other of them thereon as noise due to the sensor including the element sensitive to both the first wavelength range and the second wavelength range, the influence of this superimposed noise can be corrected.

Therefore, the accuracy of discriminating the condition of the target can be improved.

BRIEF DESCRIPTION OF THE DRAWINGS

FIG. 1 is a schematic view illustrating an overview of the configuration of a measurement apparatus according to a first embodiment.

FIG. 2 illustrates the relationship between one target and scan numbers of a sensor.

FIG. 9 is a timing chart illustrating one example of a lighting pattern of light sources according to the fourth embodiment.

DETAILED DESCRIPTION OF THE EMBODIMENTS

A. First Embodiment

Figure 3:
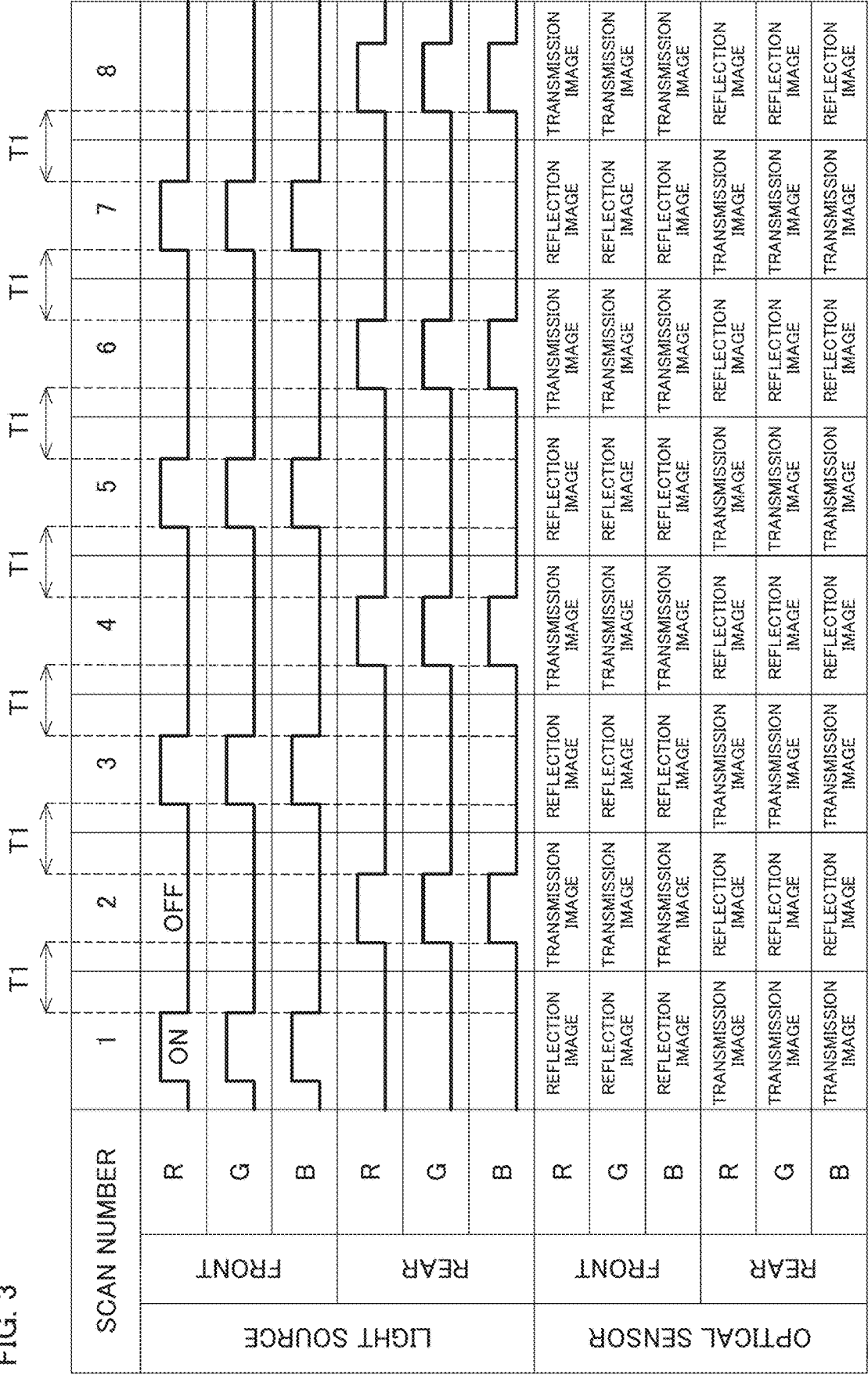
FIG. 3 is a timing chart illustrating one example of a lighting pattern of light sources.

FIG. 1 is a schematic view illustrating an overview of the configuration of a measurement apparatus 10 according to a first embodiment. The measurement apparatus 10 is an apparatus for measuring a condition (i.e., a grade) of a target 90. In the following description, the measurement apparatus 10 will be described assuming that it measures the grade (a perfect grain, an immature grain, a colored grain, a foreign object (for example, a small stone, mud, or a glass piece), or the like) of a rice grain (more specifically, brown rice or milled rice) as one example of the target 90. However, the target 90 is not limited to the rice gain, and may be any granular object. For example, the target 90 may be unhulled rice, a wheat grain, beans (a soybean, a chickpea, a green soybean, or the like), resin (a pellet or the like), a rubber piece, or the like.

As illustrated in FIG. 1, the measurement apparatus 10 includes a first light source unit 20, a second light source unit 30, a first sensor 51, a second sensor 52, a storage tank 71, a feeder 72, a chute 73, a discharge gutter 74, and a controller 80. The controller 80 controls the overall operation of the measurement apparatus 10. The controller 80 also functions as a discrimination portion 81, an irradiation control portion 82, a correction portion 83, and a reception portion 84. The functions of the controller 80 may be realized by a CPU executing a predetermined program or may be realized by a dedicated circuit. The functions of the discrimination portion 81, the irradiation control portion 82, the correction portion 83, and the reception portion 84 may be realized by a single integrated device or may be realized by individual different devices, respectively. The details of the functions of the controller 80 will be described below.

The storage tank 71 temporarily stores the target 90 therein. The feeder 72 feeds the target 90 stored in the storage tank 71 onto the chute 73 serving as one example of a target conveyance means. The target 90 fed onto the chute 73 slides on the chute 73 downward, and falls from the lower end of the chute 73. The chute 73 has a predetermined width sufficient to allow a large number of targets 90 to fall all at once. A conveyor may be employed instead of the chute 73 as the conveyance means.

The first light source unit 20 and the second light source unit 30 each irradiate the target 90 with light after the target 90 slides down from the chute 73 (i.e., the target 90 falling from the chute 73). In an alternative embodiment, the target 90 may be irradiated with the light while being sliding on the chute 73. Alternatively, in the case where the conveyor is employed instead of the chute 73, the target 90 may be irradiated with the light while being conveyed on the conveyor or falling from the conveyor.

In the present embodiment, each of the first light source unit 20 and the second light source unit 30 is a light source unit for emitting visible light. The first light source unit 20 is disposed on one side (also referred to as a front side) with respect to a conveyance route of the target 90 (i.e., a falling trajectory from the chute 73). On the other hand, the second light source unit 30 is disposed on the other side (also referred to as a rear side) with respect to the conveyance route of the target 90.

The first light source unit 20 disposed on the front side includes a front-side red light source 21, which emits front-side red light 24, a front-side green light source 22, which emits front-side green light 25, and a front-side blue light source 23, which emits front-side blue light 26. The second light source unit 30 disposed on the rear side emits light in the same wavelength range as the first light source unit 20. More specifically, the second light source unit 30 includes a rear-side red light source 31, which emits rear-side red light 34, a rear-side green light source 32, which emits rear-side green light 35, and a rear-side blue light source 33, which emits rear-side blue light 36. In the present embodiment, each of the first light source unit 20 and the second light source unit 30 is a line light source in which a plurality of LEDs is arrayed in the width direction of the chute 73. The specifications of the first light source unit 20 and the second light source unit 30 (for example, the number, the light emission type, and the wavelength range) are not especially limited.

Each of the first sensor 51 and the second sensor 52 is an optical sensor, and can detect red light, green light, and blue light individually. Each of the first sensor 51 and the second sensor 52 is a color CCD sensor in the present embodiment, but may be another type of color sensor such as a color CMOS sensor. Each of the first sensor 51 and the second sensor 52 is a line sensor in which a plurality of light receiving elements is arrayed in the width direction of the chute 73 in the present embodiment, but may be an area sensor. The specifications of the first sensor 51 and the second sensor 52 are not especially limited, and can be determined in any manner according to the specifications of the first light source unit 20 and the second light source unit 30. The first sensor 51 is disposed on the front side, and the second sensor 52 is disposed on the rear side.

The first sensor 51 on the front side can detect the front-side red light 24, the front-side green light 25, and the front-side blue light 26 respectively emitted from the front-side red light source 21, the front-side green light source 22, and the front-side blue light source 23 and reflected on the target 90. The first sensor 51 can further detect the rear-side red light 34, the rear-side green light 35, and the rear-side blue light 36 respectively emitted from the rear-side red light source 31, the rear-side green light source 32, and the rear-side blue light source 33 and transmitted through the target 90.

The second sensor 52 on the rear side can detect the rear-side red light 34, the rear-side green light 35, and the rear-side blue light 36 respectively emitted from the rear-side red light source 31, the rear-side green light source 32, and the rear-side blue light source 33 and reflected on the target 90. The second sensor 52 can further detect the front-side red light 24, the front-side green light 25, and the front-side blue light 26 respectively emitted from the front-side red light source 21, the front-side green light source 22, and the front-side blue light source 23 and transmitted through the target 90.

Hereinafter, light reflected on the target 90 and/or light transmitted through the target 90 detected by the first sensor 51 and/or the second sensor 52 will also be referred to as light associated with the target 90.

As widely known, the first sensor 51 and the second sensor 52 scan one target 90 a plurality of times. In other words, the first sensor 51 and the second sensor 52 detect the light associated with the one target 90 during each of a plurality of scan periods. The scan period refers to a duration from a start to an end of one scan. The entire image of this one target 90 is acquired by combining images acquired from the respective scans. The "scan period" can be defined as a duration since a light receiving element starts the accumulation of charges until the light receiving element ends the accumulation of charges in the case where the optical sensor is a CCD sensor. The "scan period" can be defined as a duration since a light receiving element starts the accumulation of charges until the light receiving element outputs the accumulated charges in the case where the optical sensor is a CMOS sensor.

Figure 2:
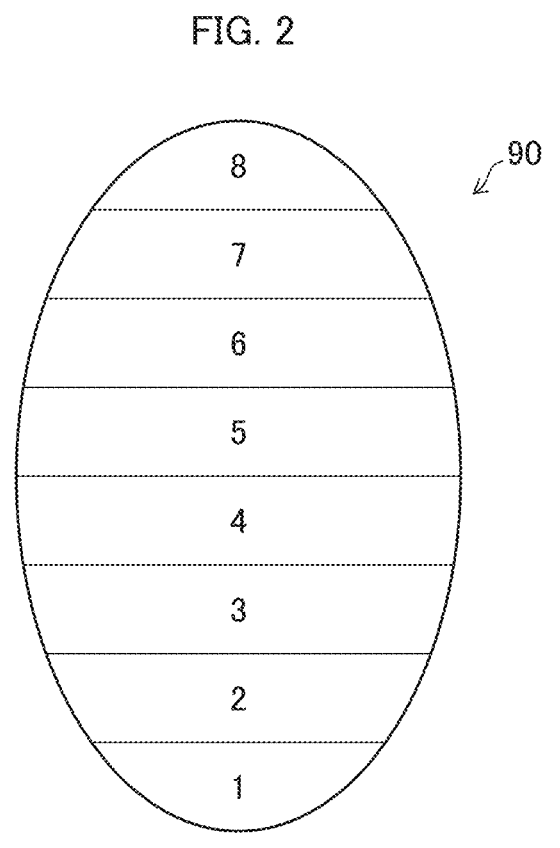

FIG. 2 illustrates the relationship between the one target 90 and scan numbers of the first sensor 51 and the second sensor 52 (numbers each indicating what number scan this scan is). As illustrated in FIG. 2, in the present embodiment, the image data is acquired by scanning the one target 90 eight times (citing an example supposing that the target 90 is scanned a smaller number of times than the actual number of times for simplification of the description). The numbers 1 to 8 illustrated in FIG. 2 each indicate the number of a scan by which the image data of the corresponding region is acquired. For example, a region labeled "1" indicates that the image data thereof is acquired by the first scan.

Outputs from the first sensor 51 and the second sensors 52 i.e., analog signals indicating detected light intensities are converted into digital signals by an AC/DC converter (not illustrated). Such a digital signal (i.e., a tone value corresponding to the analog signal) is input to the controller 80. The controller 80 discriminates the condition of the target 90 based on the input result of the detection of the light (i.e., the image) as processing performed by the discrimination portion 81 (the details thereof will be described below). This discrimination is conducted with respect to each target 90.

The irradiation with the visible light from the first light source unit 20 and the second light source unit 30 is controlled by the irradiation control portion 82 of the controller 80. The irradiation control portion 82 controls timings of lighting the front-side red light source 21, the front-side green light source 22, the front-side blue light source 23, the rear-side red light source 31, the rear-side green light source 32, and the rear-side blue light source 33 according to a predetermined rule. FIG. 3 is a timing chart illustrating one example of the timings of lighting the first light source unit 20 and the second light source unit 30. In FIG. 3, the scan periods of the first sensor 51 and the second sensor 52 are associated with the timings of lighting the first light source unit 20 and the second light source unit 30. In FIG. 3, "R", "G", and "B" represent red, green, and blue, respectively. Further, "SCAN NUMBER" corresponds to the scan number illustrated in FIG. 2.

As illustrated in FIG. 3, the front-side red light source 21 is on for a predetermined time only during scan periods having odd scan numbers (indicated with ON in FIG. 3), and is off entirely during scan periods having even scan numbers (indicated with OFF in FIG. 3). On the other hand, the rear-side red light source 31 is on for a predetermined time only during the scan periods having the even scan numbers, and is off entirely during the scan periods having the odd scan numbers. In other words, the front-side red light source 21 and the rear-side red light source 31 are alternately on in such a manner that only any one of them is turned on during one scan period. In sum, the irradiation period of the front-side red light source 21 and the irradiation period of the rear-side red light source 31 do not overlap each other and occur alternately.

Similarly, the irradiation period of the front-side green light source 22 and the irradiation period of the rear-side green light source 32 do not overlap each other and occur alternately, and the irradiation period of the front-side blue light source 23 and the irradiation period of the rear-side blue light source 33 do not overlap each other and occur alternately. In other words, the first light source unit 20 is on only during the scan periods having the odd scan numbers, and the second light source unit 30 is on only during the scan periods having the even scan numbers.

According to such a lighting pattern, the first sensor 51 on the front side acquires a reflection image of each of R, G, and B based on the light from the first light source unit 20 during the scan periods having the odd scan numbers, and acquires a transmission image of each of R, G, and B based on the light from the second light source unit 30 during the scan periods having the even scan numbers. On the other hand, the second sensor 52 on the rear side acquires a transmission image of each of R, G, and B based on the light from the first light source unit 20 during the scan periods having the odd scan numbers, and acquires a reflection image of each of R, G, and B based on the light from the second light source unit 30 during the scan periods having the even scan numbers.

As illustrated in FIG. 3, in the present embodiment, the irradiation control portion 82 controls the first light source unit 20 and the second light source unit 30 in such a manner that a non-irradiation period T1, in which no light is emitted from any of the light sources, is interposed between a period in which the light is emitted from the first light source unit 20 on the front side and a period in which the light is emitted from the second light source unit 30 on the rear side. Setting the non-irradiation period T1 can contribute to easily preventing the light from one of the first light source unit 20 and the second light source unit 30 from being affected by superimposition of the light from the other of them thereon as noise during each of the scan periods. Therefore, the discrimination accuracy of the discrimination processing, which will be described below, can be improved.

In the present embodiment, the non-irradiation period T1 is set so as to extend across a boundary between two scan periods adjacent to each other. Therefore, the noise superimposition can be reliably prevented. However, the non-irradiation period T1 may be ended at the same time as when the scan period is switched, or may be started at the same time as when the scan period is switched.

The discrimination portion 81 discriminates the grade of the target 90 based on the reflection image and the transmission image of each of red, green, and blue acquired in this manner. More specifically, the front-side reflection image and the rear-side transmission image of each of R, G, and B colors formed by regions numbered with the odd scan numbers in FIG. 2, and the front-side transmission image and the rear-side reflection image of each of R, G, and B colors formed by regions numbered with the even scan numbers in FIG. 2 are used for the processing performed by the discrimination portion 81.

Figure 4:
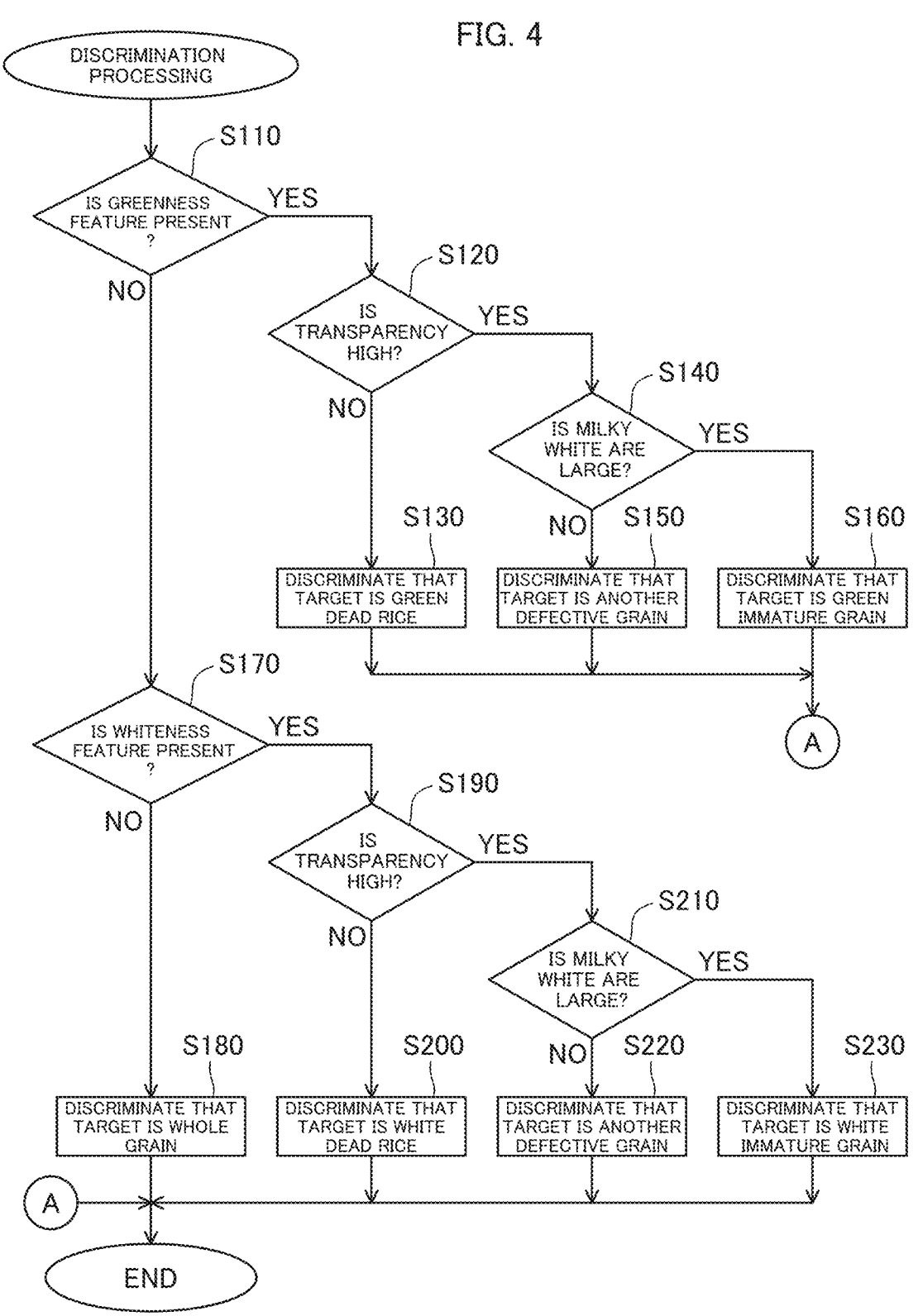
FIG. 4 is a flowchart illustrating one example of discrimination processing.

FIG. 4 is a flowchart illustrating one example of the discrimination processing performed by the discrimination portion 81 based on such images. The discrimination processing is performed with respect to each target 90. FIG. 4 will be described assuming that the target 90, which is brown rice, is discriminated into one of a "perfect grain", "green dead rice", a "green immature grain", "white dead rice", a "white immature grain", and "another defective grain" for the sake of simplification, but, actually, the target 90 can be discriminated in various manners based on various kinds of information. For example, the target 90 may be discriminated into a broken grain or a cracked grain based on the feature of the outline of the image. Alternatively, a colored grain may be discriminated by binarizing an image in a predetermined color with a threshold.

In the discrimination processing, the discrimination portion 81 first determines whether a greenness feature appears in the image of the target 90 (step S110). This determination may be made based on, for example, a value of $(RR+RB)/RG$. RR, RB, and RG represent tone values of the red reflection image, the blue reflection image, and the green reflection image, respectively. In this case, the target 90 can be determined to have a greenness feature if the value of $(RR+RB)/RG$ is equal to or smaller than a first threshold value.

The determination in step S110 may be made using an average value of the image acquired by the first sensor 51 (hereinafter also referred to as a front-side image) and the image acquired by the second sensor 52 (hereinafter also referred to as a rear-side image). Alternatively, step S110 may be a determination about whether the greenness feature appears in both the front-side image and the rear-side image. Alternatively, step S110 may be a determination about whether the greenness feature appears in at least one of the front-side image and the rear-side image. The same also applies to other determination steps that will be described below.

If a greenness feature is present as a result of the determination (step S110: YES), the discrimination portion 81 next determines whether the transparency is high (step S120). This determination may be made based on, for example, a value of RG/TG. TG represents the tone value of the green transmission image. In this case, the transparency can be determined to be high if the value of RG/TG is equal to or smaller than a second threshold value.

If the transparency is low as a result of the determination (step S120: NO), the discrimination portion 81 discriminates that the target 90 is green dead rice (step S130). On the other hand, if the transparency is high (step S120: YES), the discrimination portion 81 next determines whether a milky white area is large (step S140). This determination may be made based on, for example, a value of RG or TG. In this case, the milky white portion of the target 90 appears brightly in the green reflection image, and therefore the number of pixels having an RG value equal to or larger than a third threshold value is counted, and the target 90 can be determined to have a large milky white area if the counted number of pixels is equal to or larger than a fourth threshold value. Alternatively, the milky white portion of the target 90 appears darkly in the green transmission image, and therefore the number of pixels having a TG value equal to or smaller than a fifth threshold value is counted, and the target 90 can be determined to have a large milky white area if the counted number of pixels is equal to or larger than a sixth threshold value.

If the milky white area is large as a result of the determination (step S140: YES), the discrimination portion 81 discriminates that the target 90 is a green immature grain (step S160). On the other hand, if the milky white area is small (step S140: NO), the discrimination portion 81 discriminates that the target 90 is another defective grain (step S150).

Further, if no greenness feature is present (step S110: NO), the discrimination portion 81 determines whether a whiteness feature appears in the image of the target 90 (step S170). This determination may be made based on, for example, a value of (RR+RG+RB)/TG. In this case, the target 90 can be determined to have a whiteness feature if the value of (RR+RG+RB)/TG is equal to or larger than a seventh threshold value.

If no whiteness feature is present as a result of the determination (step S170: NO), the discrimination portion 81 discriminates that the target 90 is a perfect grain. On the other hand, if a whiteness feature is present (step S170: YES), the discrimination portion 81 next determines whether the transparency is high (step S190). This determination may be made based on, for example, a value of RR/TG. In this case, the transparency can be determined to be high if the value of RR/TG is equal to or smaller than an eighth threshold value.

If the transparency is low as a result of the determination (step S190: NO), the discrimination portion 81 discriminates that the target 90 is white dead rice (step S200). On the other hand, if the transparency is high (step S190: YES), the discrimination portion 81 next determines whether a milky white area is large (step S210). This determination can be made by a method similar to the above-described step S140. If the milky white area is large as a result of the determination (step S210: YES), the discrimination portion 81 discriminates that the target 90 is a white immature grain (step S230). On the other hand, if the milky white area is small (step S210: NO), the discrimination portion 81 discriminates that the target 90 is another defective grain (step S220).

After the grade of the target 90 (a condition type) is discriminated in this manner, the discrimination processing is ended. The controller 80 may store collected results of the discrimination processing into a memory or may output it to any device. The output destination may be, for example, a display, a printer, or a communication interface for communicating with an external device.

According to the above-described measurement apparatus 10, the reflected light and the transmitted light based on the light emitted from each of the first light source unit 20 and the second light source unit 30 set up at different positions can be detected for each of R, G, and B separately. Therefore, a larger number of condition types can be discriminated by the discrimination portion 81. For example, conventional optical sorters have been able to acquire fewer types of light information, and therefore have been incapable of discriminating a green immature grain, a white immature grain, green dead rice, and white dead rice, thereby discriminating them as defective products collectively. On the other hand, according to the measurement apparatus 10, a green immature grain, a white immature grain, green dead rice, and white dead rice can be discriminated as exemplarily indicated referring to the discrimination processing illustrated in FIG. 4. This allows farmers to confirm the contents and the proportion of defective products contained in the targets 90 in further detail to contemplate measures for improving the quality. The example illustrated in FIG. 4 indicates the example in which the target 90 is discriminated mainly based on the green transmission image, but equivalent discrimination is possible even using the blue transmission image instead of or in addition to the green transmission image.

In addition, the irradiation period of the first light source unit 20 and the irradiation period of the second light source unit 30 do not overlap each other, and therefore interference is prevented between the light beams respectively emitted from the first light source unit 20 and the second light source unit 30 set up at different positions. Further, the irradiation period of the first light source unit 20 and the irradiation period of the second light source unit 30 alternately occur, and therefore the reflection image and the transmission image can be acquired at sufficient resolution during any of the first irradiation period and the second irradiation period. Therefore, the accuracy of discriminating the condition of the target 90 can be excellently ensured. The first light source unit 20 is a non-limiting example of one of a "first irradiation source" and a "second irradiation source in the claims, and the second light source unit 30 is a non-limiting example of the other of the "first irradiation source" and the "second irradiation source". Alternatively, any one or two of the front-side red light source 21, the front-side green light source 22, and the front-side blue light source 23 may be interpreted as a non-limiting example of one of the "first irradiation source" and the "second irradiation source", and any one or two of the rear-side red light source 31, the rear-side green light source 32, and the rear-side blue light source 33 may be interpreted as a non-limiting example of the other of the "first irradiation source" and the "second irradiation source".

According to the above-described measurement apparatus 10, the chute 73 is used as a means for conveying the target 90. Therefore, a large number of targets 90 can be conveyed all at once. Therefore, the measurement apparatus 10 can be equipped with high processing capability per time. A similar effect can also be acquired when the conveyor is employed instead of the chute 73.

In the present embodiment, the measurement apparatus 10 further has a function for improving the discrimination accuracy of the discrimination portion 81. Now, such a function will be described.

Figure 5:
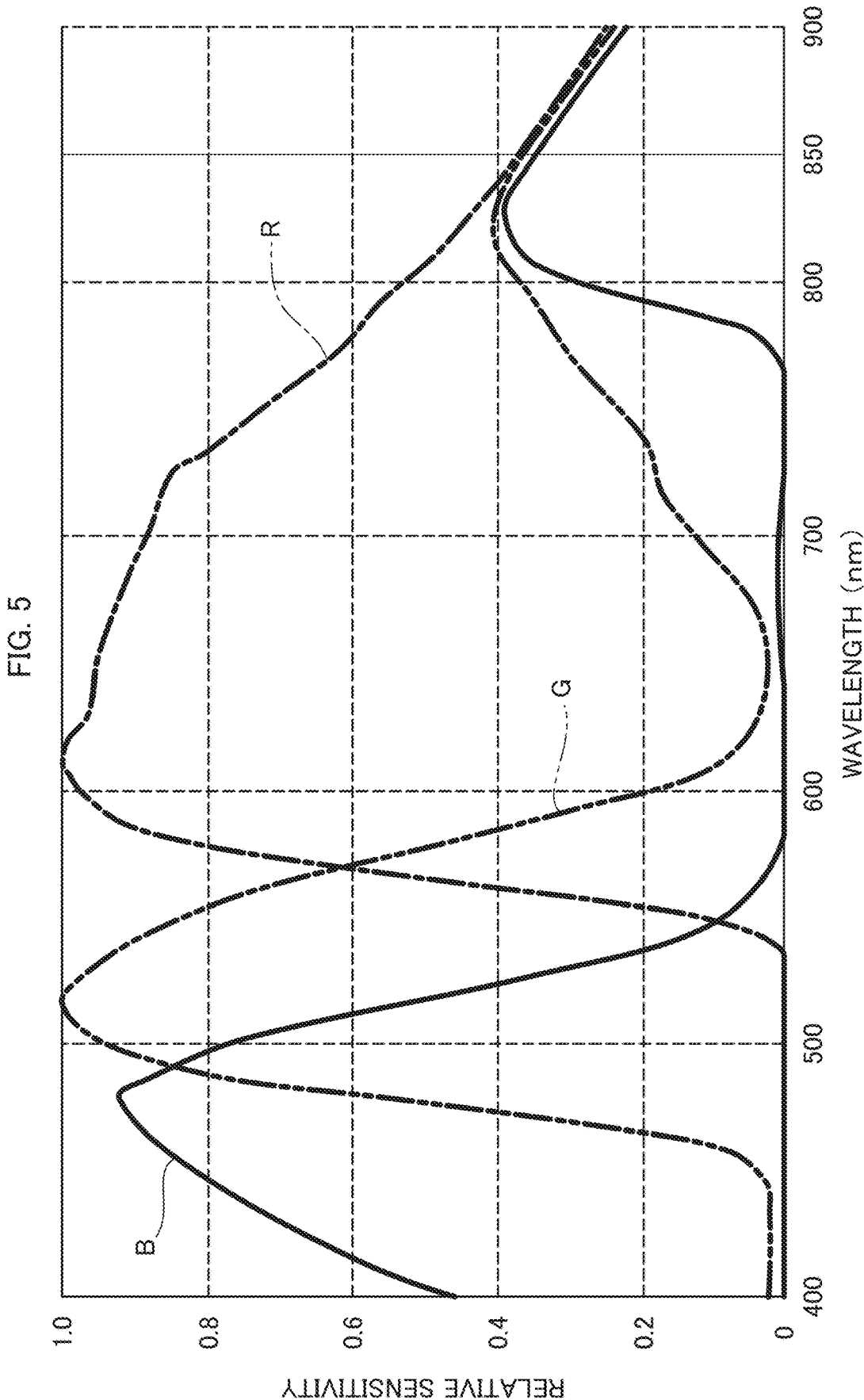
FIG. 5 is a graph illustrating one example of the spectral sensitivity characteristic of a light receiving element for each color of a first sensor and a second sensor.

FIG. 5 is a graph illustrating one example of the spectral sensitivity characteristic of the light receiving element for each of R, G, and B of the first sensor 51. The second sensor 52 also has the same characteristic as the first sensor 51. As illustrated, the spectral sensitivities of the respective light receiving elements of R, G, and B share overlapping sensitivity ranges (wavelength ranges). Therefore, for example, if the wavelength range of the front-side blue light 26 emitted from the front-side blue light source 23 is 400 to 450 nm, and the wavelength range of the front-side green light 25 emitted from the front-side green light source 22 is 500 to 550 nm, the light receiving element for B is not only sensitive to the wavelength range of the front-side blue light source 23 but also is too sensitive to the wavelength range of the front-side green light source 22 to ignore. Therefore, the front-side green light 25 is undesirably superimposed as noise when the first sensor 51 detects the front-side blue light 26.

In the case of the example illustrated in FIG. 5, the correction portion 83 of the controller 80 makes a correction of reducing the intensity of the signal acquired by the light receiving element for B of each of the first sensor 51 and the second sensor 52 to correct such superimposition of noise. Then, the discrimination portion 81 performs the above-described discrimination processing based on the intensity of the signal after the correction. Such a correction may be made by multiplying the signal acquired by the light receiving element for B of each of the first sensor 51 and the second sensor 52 by a correction coefficient smaller than 1. According to such processing, the accuracy of the discrimination by the discrimination portion 81 can be further improved. Which sensor and which color of light receiving element should be subjected to the correction can be determined appropriately in consideration of the characteristic of a combination of the wavelength range of the light source and the spectrum sensitivity of the sensor. Further, the level of the correction (how much the intensity of the signal should be reduced) can be set in advance based on an experiment or the like after the characteristic of this combination is understood.

Further, the reception portion 84 of the controller 80 receives an input of the kind of the target 90 (for example, brown rice, milled rice, a wheat grain, or resin) that should be measured by the measurement apparatus 10. The kind of the target 90 may be input by a user via a user interface of the measurement apparatus 10 or an information terminal communicably connected to the measurement apparatus 10. Further, the level of the correction (for example, the above-described correction coefficient) set for each kind of the target 90 expected in advance is stored in a memory of the controller 80. The level of the correction for each kind may be set for each light receiving element for each color. Then, the correction portion 83 makes the above-described correction based on the level of the correction corresponding to the kind of the target 90 received by the reception portion 84. In other words, the correction portion 83 changes the level of the correction according to the kind of the target 90 received by the reception portion 84. The optical characteristic (the reflection characteristic, the transmission characteristic, and the like) of the target 90 varies (i.e., the magnitude of the superimposed noise varies) depending on the kind of the target 90, and therefore the influence of the above-described superimposed noise can be further accurately corrected by making the correction according to the kind of the target 90 in this manner.

Further, the correction portion 83 changes the level of the correction according to the intensity of the signal acquired by the light receiving element of each of the first sensor 51 and the second sensor 52 that is targeted for the correction. The optical characteristic (the reflection characteristic, the transmission characteristic, and the like) of the target 90 varies (i.e., the magnitude of the superimposed noise varies) depending on the condition of the target 90 (for example, whether the target 90 is a perfect grain, a green immature grain, or green dead rice in the case where the target 90 is rice), and therefore a difference in the condition of the target 90 is correlated with the intensity of the signal acquired by the light receiving element. Accordingly, changing the level of the correction according to the intensity of the signal acquired by the light receiving element means changing the level of the correction according to the condition of the target 90. The influence of the above-described superimposed noise can be further accurately corrected by making the correction according to the condition of the target 90 in this manner.

B. Second Embodiment

Figure 6:
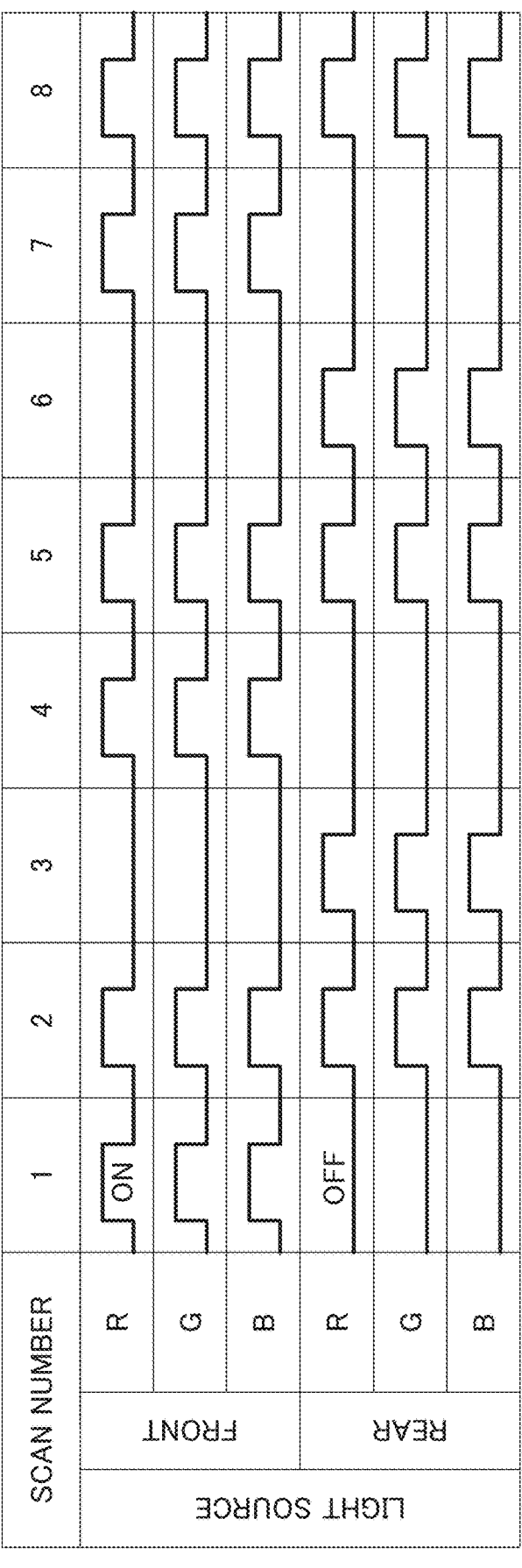
FIG. 6 is a timing chart illustrating one example of a lighting pattern of light sources according to a second embodiment.

In the following description, a second embodiment will be described with reference to FIG. 6. The second embodiment is different from the first embodiment only in terms of the timings of lighting the first light source unit 20 and the second light source unit 30, and is similar to the first embodiment except for that. As illustrated in FIG. 6, in the second embodiment, only the first light source unit 20 on the front side is on during a (3N−2)-th scan period (N is a natural number). Both the first light source unit 20 on the front side and the second light source unit 30 on the rear side are on at the same time during a (3N−1)-th scan period. Only the second light source unit 30 on the rear side is on during a 3N-th scan period.

In other words, in the second embodiment, the irradiation period of only the first light source unit 20 and the irradiation period of only the second light source unit 30 do not overlap each other and occur alternately while the irradiation period of both the first light source unit 20 and the second light source unit 30 is interposed therebetween. In this manner, another irradiation period may be interposed between the irradiation period of only the first light source unit 20 (a non-limiting example of one of the "first irradiation period" and the "second irradiation period" in the claims), and the irradiation period of only the second light source unit 30 (a non-limiting example of the other of the "first irradiation period" and the "second irradiation period" in the claims). Such a configuration can also achieve advantageous effects similar to the first embodiment.

Further, in the (3N−1)-th scan period, both the first light source unit 20 on the front side and the second light source unit 30 on the rear side are on at the same time, and therefore each of the first sensor 51 and the second sensor 52 additionally acquires a reflection and transmission image expressed by light generated by combining the reflected light and the transmitted light for each of R, G, and B. This allows the first sensor 51 and the second sensor 52 to acquire a larger number of types of images, thus allowing the discrimination portion 81 to discriminate a larger number of types of conditions. The frequency at which both the first light source unit 20 and the second light source unit 30 are on at the same time may be equal to or may be lower than the frequency at which one of the first light source unit 20 and the second light source unit 30 is on.

C. Third Embodiment

Figure 7:
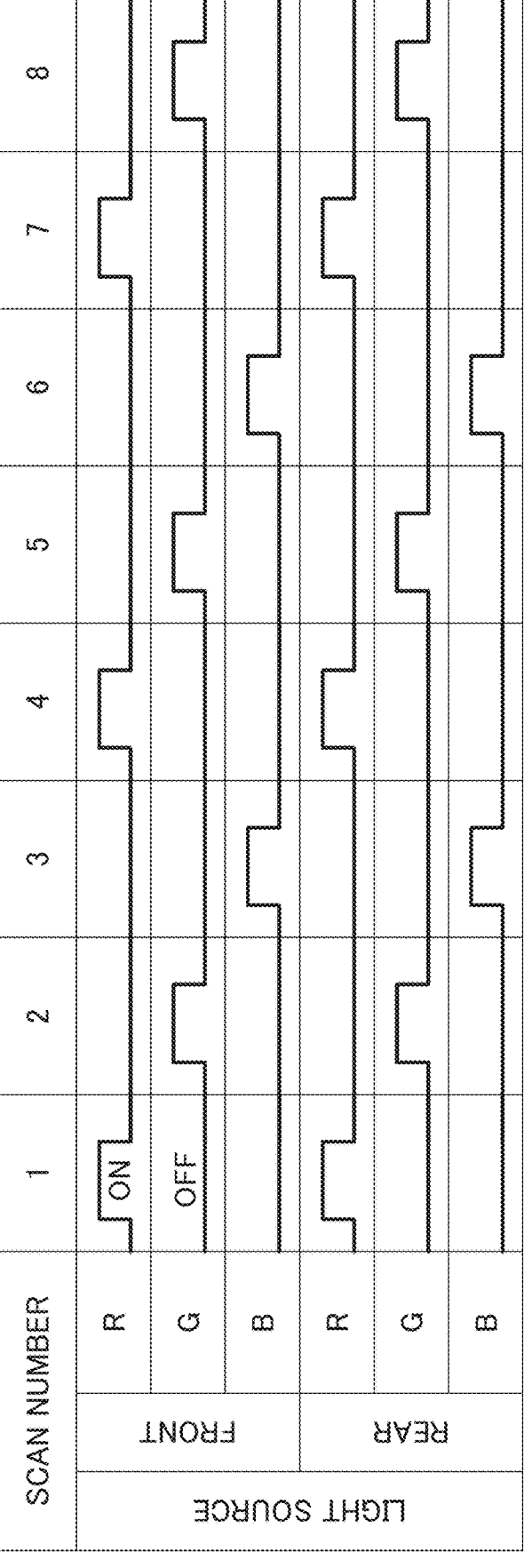
FIG. 7 is a timing chart illustrating one example of a lighting pattern of light sources according to a third embodiment.

In the following description, a third embodiment will be described with reference to FIG. 7. The third embodiment is different from the first embodiment only in terms of the timings of lighting the first light source unit 20 and the second light source unit 30, and is similar to the first embodiment except for that. As illustrated in FIG. 7, in the third embodiment, only the front-side red light source 21 and the rear-side red light source 31 are on at the same time and the other light sources are off during a (3M−2)-th scan period (M is a natural number). Only the front-side green light source 22 and the rear-side green light source 32 are on at the same time and the other light sources are off during a (3M−1)-th scan period. Only the front-side blue light source 23 and the rear-side blue light source 33 are on at the same time and the other light sources are off during a (3M)-th scan period. In other words, the respective irradiation periods of the plurality of light sources respectively having different wavelength ranges do not overlap each other and occur alternately. According to this lighting pattern, each of the first sensor 51 and the second sensor 52 can acquire a reflection and transmission image with respect to each of R, G, and B.

In such a lighting pattern, one or both of the front-side red light source 21 and the rear-side red light source 31 can be a non-limiting example of any one of the "first irradiation source" and the "second irradiation source" in the claims. Similarly, one or both of the front-side green light source 22 and the rear-side green light source 32 can be a non-limiting example of any one of the "first irradiation source" and the "second irradiation source" in the claims. Similarly, one or both of the front-side blue light source 23 and the rear-side blue light source 33 can be a non-limiting example of any one of the "first irradiation source" and the "second irradiation source" in the claims.

Such a lighting pattern also allows the first sensor 51 and the second sensor 52 to acquire a larger number of types of images while avoiding interference between the light beams emitted from the plurality of light sources respectively having different wavelength ranges, thus allowing the discrimination portion 81 to discriminate a larger number of types of conditions.

D. Fourth Embodiment

Figure 8:
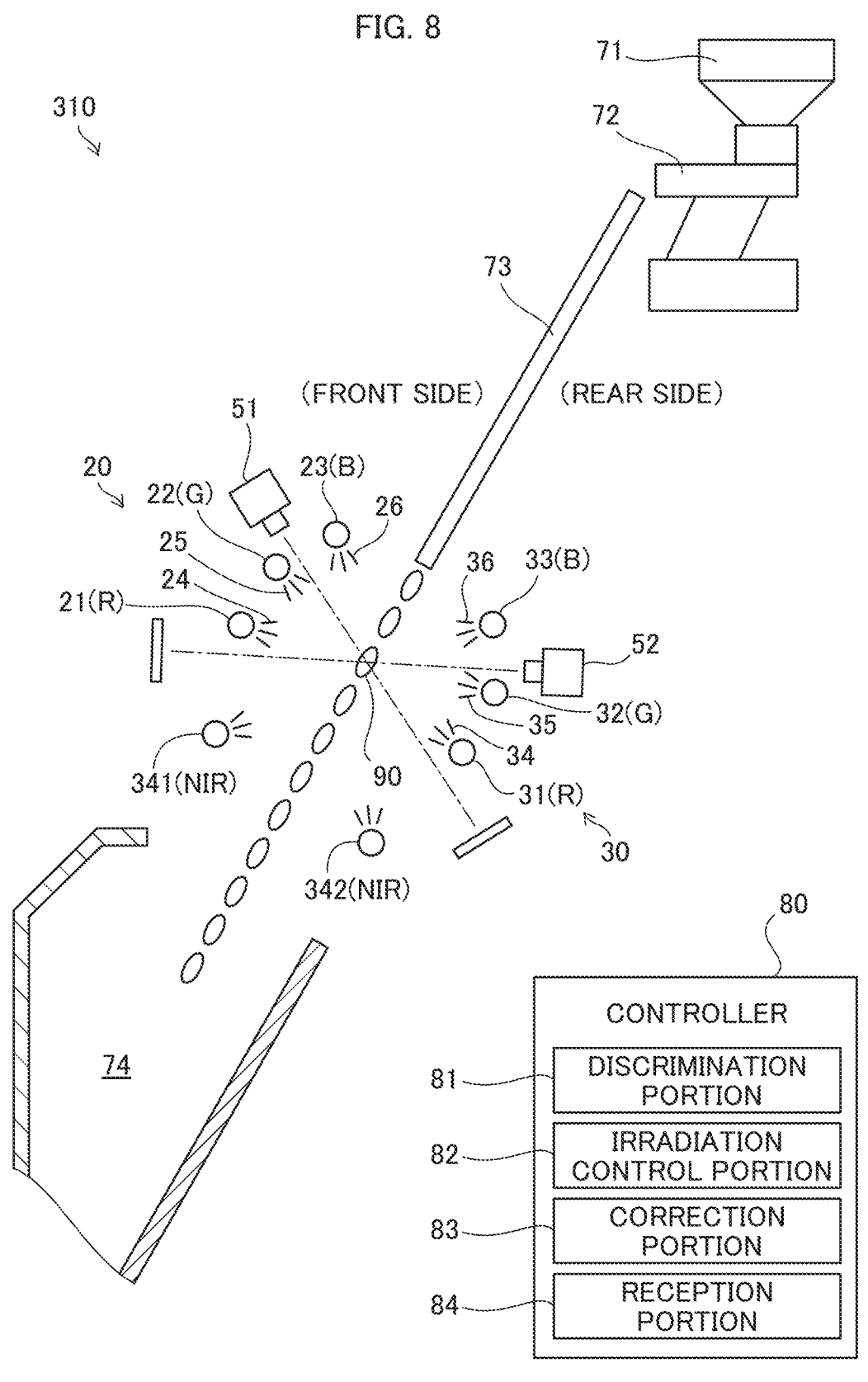
FIG. 8 is a schematic view illustrating an overview of the configuration of a measurement apparatus according to a fourth embodiment.

In the following description, a fourth embodiment will be described with reference to FIGS. 8 and 9. As illustrated in FIG. 8, a measurement apparatus 310 according to the fourth embodiment is different from the first embodiment, as the apparatus configuration, in terms of further including a front-side near-infrared light source 341 and a rear-side near-infrared light source 342 and being capable of detecting near-infrared light by the first sensor 51 and the second sensor 52, and is similar to the first embodiment except for that. In an alternative embodiment, a sensor for near-infrared light may be set up on each of the front side and the rear side in addition to the first sensor 51 and the second sensor 52 for visible light.

Figure 9:
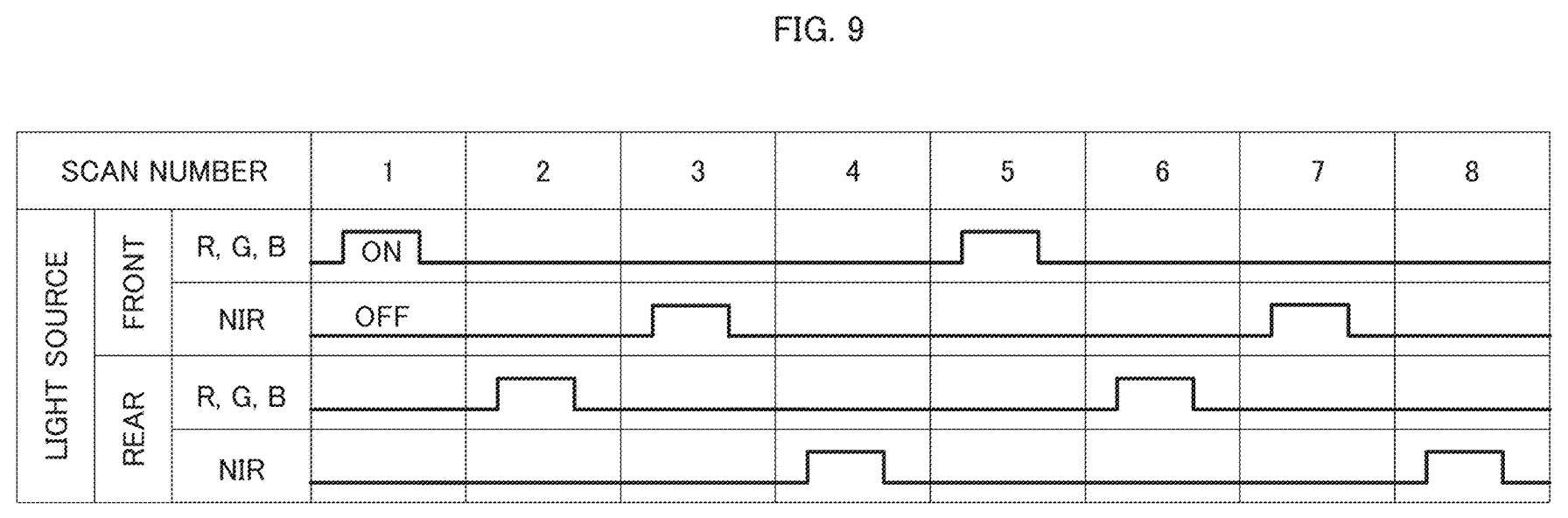

In this measurement apparatus 310, the light sources are controlled according to a lighting pattern illustrated in FIG. 9. More specifically, only the first light source unit 20 is on and the other light sources are off during a (4P−3)-th scan period (P is a natural number). Only the second light source unit 30 is on and the other light sources are off during a (4P−2)-th scan period. Only the front-side near-infrared light source 341 is on and the other light sources are off during a (4P−1)-th scan period. Only the rear-side near-infrared light source 342 is on and the other light sources are off during a 4P-th scan period. In other words, the respective irradiation periods of the first light source unit 20 and the second light source unit 30 set up at different positions do not overlap each other and occur alternately. Further, the respective irradiation periods of the front-side near-infrared light source 341 and the rear-side near-infrared light source 342 set up at different positions and having wavelength ranges different from the first light source unit 20 and the second light source unit 30 do not overlap each other and occur alternately.

Such a lighting pattern also allows a further larger number of types of images to be acquired while avoiding interference between the light beams emitted from the plurality of light sources set up at different positions and having different wavelength ranges, thus allowing the discrimination portion 81 to discriminate a further larger number of types of conditions. The lighting pattern may be set so as not to permit interference between visible light beams and between near-infrared light beams but to permit interference between visible light and near-infrared light. In other words, the lighting pattern illustrated in FIG. 9 can be modified into a lighting pattern in which the irradiation period of one of the first light source unit 20 and the second light source unit 30 and the irradiation period of one of the front-side near-infrared light source 341 and the rear-side near-infrared light source 342 overlap each other, as long as the respective irradiation periods of the first light source unit 20 and the second light source unit 30 do not overlap each other and occur alternately and the respective irradiation periods of the front-side near-infrared light source 341 and the rear-side near-infrared light source 342 do not overlap each other and occur alternately.

E. Fifth Embodiment

Figure 10:
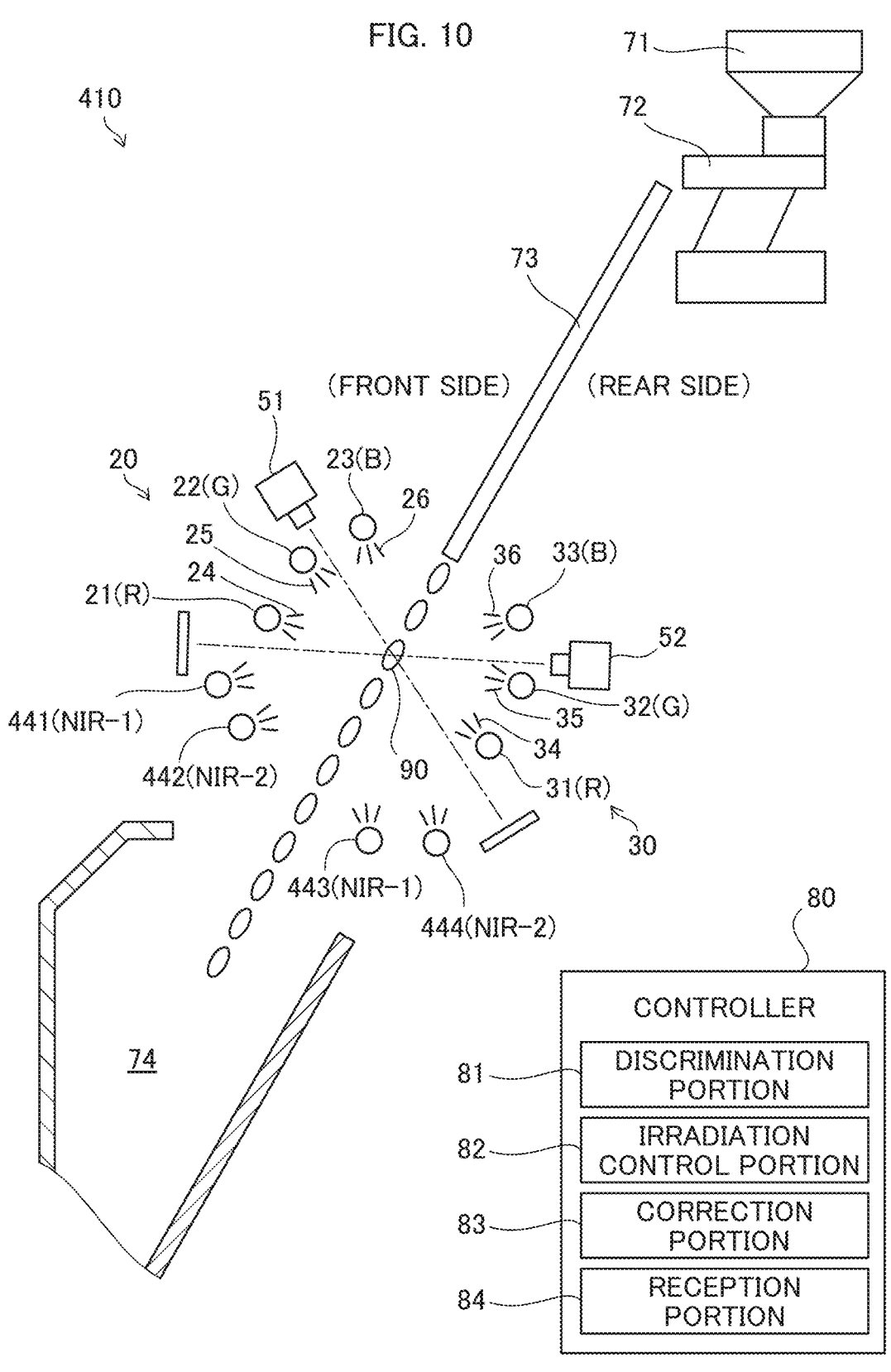
FIG. 10 is a schematic view illustrating an overview of the configuration of a measurement apparatus according to a fifth embodiment.

In the following description, a fifth embodiment will be described with reference to FIGS. 10 and 11. As illustrated in FIG. 10, a measurement apparatus 410 according to the fifth embodiment is different from the first embodiment, as the apparatus configuration, in terms of further including a front-side first near-infrared light source 441, a front-side second near-infrared light source 442, a rear-side first near-infrared light source 443, and a rear-side second near-infrared light source 444 and being capable of detecting near-infrared light by the first sensor 51 and the second sensor 52, and is similar to the first embodiment except for that. In an alternative embodiment, a sensor for near-infrared light may be additionally set up on each of the front side and the rear side in addition to the first sensor 51 and the second sensor 52 for visible light.

The front-side first near-infrared light source 441 and the rear-side first near-infrared light source 443 are configured to emit near-infrared light in a first wavelength range, and the front-side second near-infrared light source 442 and the rear-side second near-infrared light source 444 are configured to emit near-infrared light in a second wavelength range different from the first wavelength range. Each of the first sensor 51 and the second sensor 52 (or each of the front-side sensor and the rear-side sensor for near-infrared light additionally set up in addition to the first sensor 51 and the second sensor 52 for visible light) may be able to detect both the near-infrared light in the first wavelength range and the near-infrared light in the second wavelength range, or may be able to detect one of the near-infrared light in the first wavelength range and the near-infrared light in the second wavelength range.

Figure 11:
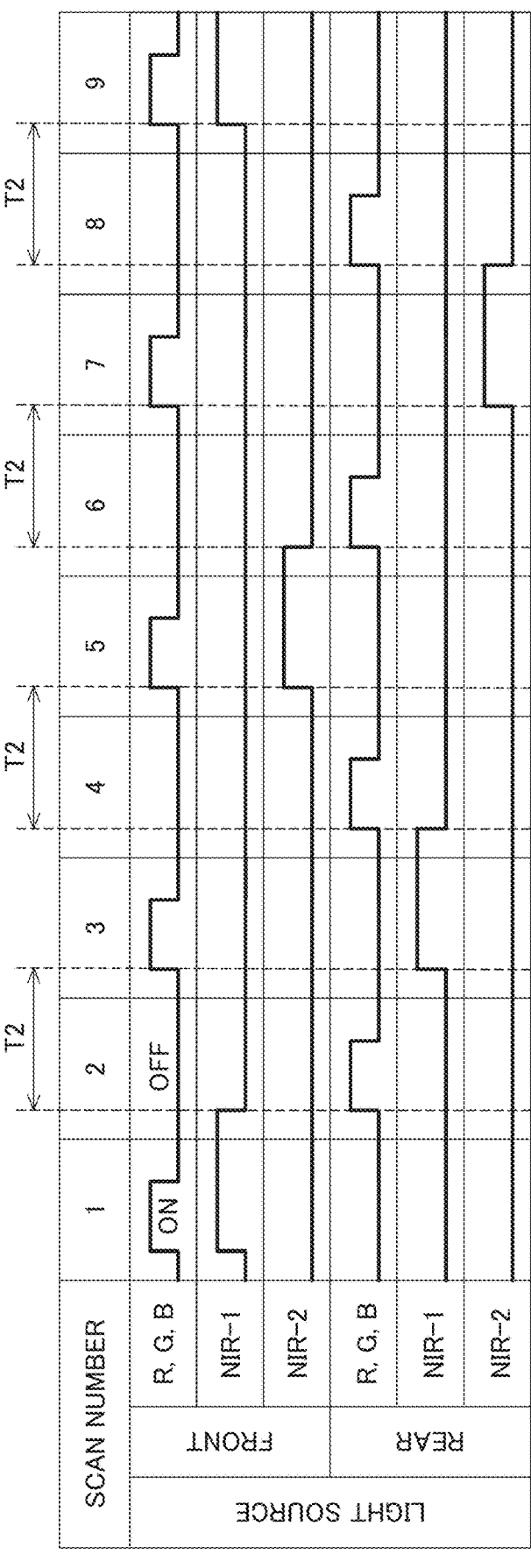
FIG. 11 is a timing chart illustrating one example of a lighting pattern of light sources according to the fifth embodiment.

In this measurement apparatus 410, the light sources are controlled according to a lighting pattern illustrated in FIG. 11. More specifically, the lighting pattern of the first light source unit 20 and the second light source unit 30, which emit the visible light, is similar to the first embodiment (refer to FIG. 3). The front-side first near-infrared light source 441, which emits the near-infrared light in the first wavelength range, is on across during an (8Q–7)-th scan period (Q is a natural number) and an (8Q–6)-th scan period. The rear-side first near-infrared light source 443, which emits the near-infrared light in the first wavelength range, is on across during an (8Q–5)-th scan period and an (8Q–4)-th scan period. The front-side second near-infrared light source 442, which emits the near-infrared light in the second wavelength range, is on across during an (8Q–3)-th scan period and an (8Q–2)-th scan period. The rear-side second near-infrared light source 444, which emits the near-infrared light in the second wavelength range, is on across during an (8Q–1)-th scan period and an 8Q-th scan period. A non-irradiation period T2, in which none of the near-infrared light sources 441 to 444 is on, is set between the respective irradiation periods of the front-side first near-infrared light source 441, the rear-side first near-infrared light source 443, the front-side second near-infrared light source 442, and the rear-side second near-infrared light source 444.

Like the example of the near-infrared light sources 441 to 444 illustrated in FIG. 11, the near-infrared light sources 441 to 444 may be continuously on across during a plurality of scan periods depending on the performances of the first sensor 51 and the second sensor 52. In this case, the discrimination portion 81 may perform the discrimination processing based on a calculation result of adding up the respective outputs of the first sensor 51 during the plurality of scan periods, or may perform the discrimination processing based on a calculation result of adding up the respective outputs of the second sensor 52 during the plurality of scan periods.

According to such a lighting pattern, the irradiation period of the front-side first near-infrared light source 441, the irradiation period of the rear-side first near-infrared light source 443, the irradiation period of the front-side second near-infrared light source 442, and the irradiation period of the rear-side second near-infrared light source 444 do not overlap each other and occur alternately. Therefore, the reflection image and the transmission image can be acquired while interference is avoided with respect to the near-infrared light beams in two kinds of wavelength ranges.

One or both of the front-side first near-infrared light source 441 and the rear-side first near-infrared light source 443 can be a non-limiting example of one of the "first irradiation source" and the "second irradiation source" in the claims. One or both of the front-side second near-infrared light source 442 and the rear-side second near-infrared light source 444 can be a non-limiting example of the other of the "first irradiation source" and the "second irradiation source" in the claims. Alternatively, one or both of the front-side first near-infrared light source 441 and the rear-side first near-infrared light source 443 can be a non-limiting example of one of a "third irradiation source" and a "fourth irradiation source" in the claims. One or both of the front-side second near-infrared light source 442 and the rear-side second near-infrared light source 444 can be a non-limiting example of the other of the "third irradiation source" and the "fourth irradiation source" in the claims.

Further, one or both of the front-side first near-infrared light source 441 and the front-side second near-infrared light source 442 can be a non-limiting example of one of the "first irradiation source" and the "second irradiation source" in the claims. One or both of the rear-side first near-infrared light source 443 and the rear-side second near-infrared light source 444 can be a non-limiting example of the other of the "first irradiation source" and the "second irradiation source" in the claims. Alternatively, one or both of the front-side first near-infrared light source 441 and the front-side second near-infrared light source 442 can be a non-limiting example of one of the "third irradiation source" and the "fourth irradiation source" in the claims. One or both of the rear-side first near-infrared light source 443 and the rear-side second near-infrared light source 444 can be a non-limiting example of the other of the "third irradiation source" and the "fourth irradiation source" in the claims.

F. Sixth Embodiment

Figure 12:
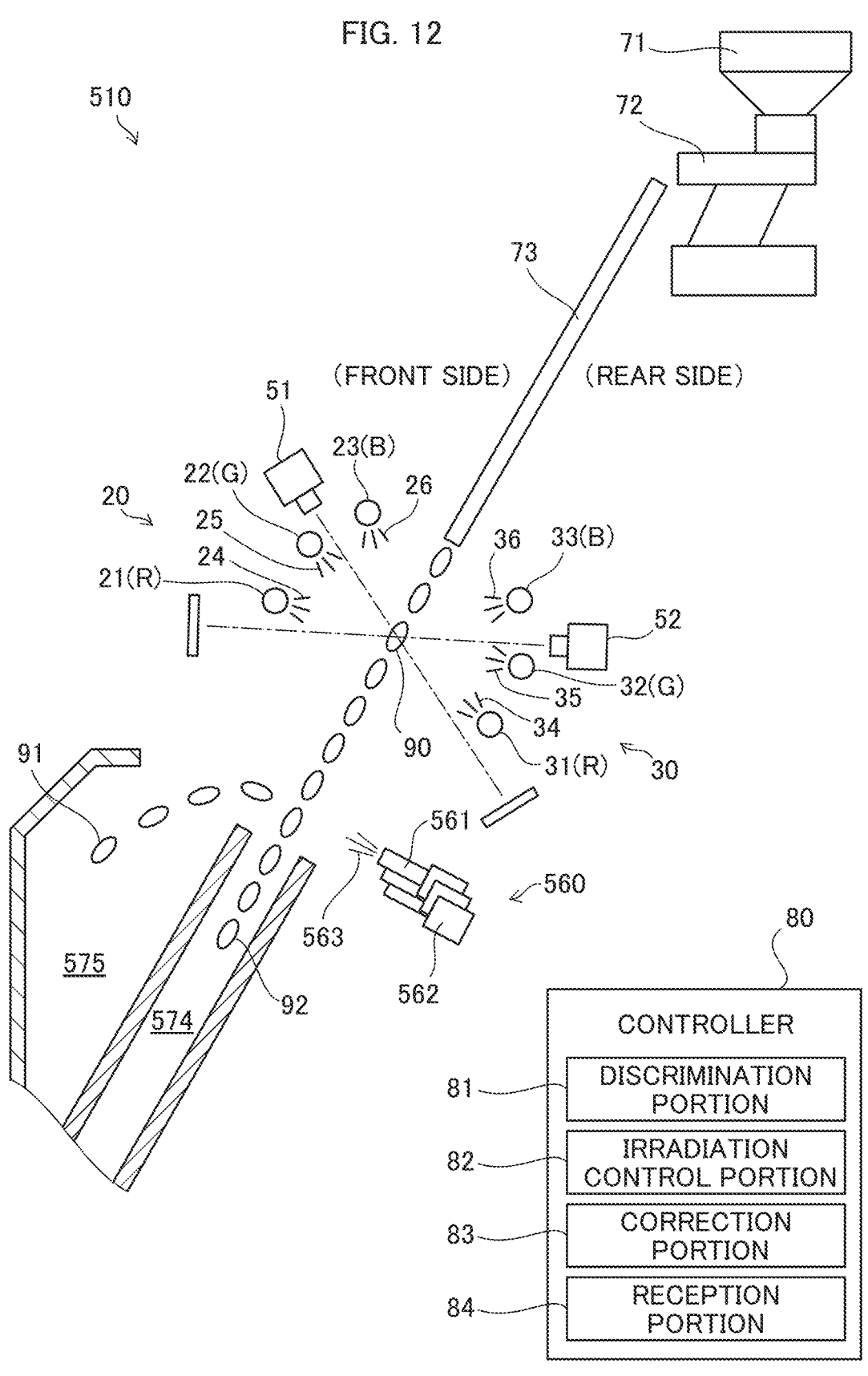
FIG. 12 is a schematic view illustrating an overview of the configuration of a sorting apparatus according to a sixth embodiment.

In the following description, a sixth embodiment will be described with reference to FIG. 12. As illustrated in FIG. 12, a sorting apparatus 510 according to the sixth embodiment is different from the first embodiment only in terms of including a sorting portion 560 in addition to the measurement apparatus 10 according to the first embodiment. The sorting portion 560 sorts out the target 90 by ejecting air 563 toward the target 90 discriminated to be a defective product (a rice grain other than a perfect grain) by the discrimination portion 81. More specifically, the sorting portion 560 includes a plurality of nozzles 561 and valves 562 as many as the nozzles 561 (the number of valves 562 is the same as the number of nozzles 561 in the present embodiment, but may be different from the number of nozzles 561). The plurality of nozzles 561 are arrayed in the width direction of the chute 73.

The plurality of nozzles 561 are connected to a compressor (not illustrated) via the plurality of valves 562, respectively. The plurality of valves 562 are selectively opened according to a control signal from the controller 80, by which the plurality of nozzles 561 selectively eject the air 563 toward the target 90 discriminated to be a defective product. The target 90 discriminated to be a defective product is blown off by the air 563, and is deviated from the falling trajectory from the chute 73 and guided to a defective product discharge gutter 575 (indicated as a target 91 in FIG. 12). On the other hand, the air 563 is not ejected toward the target 90 discriminated to be an acceptable product (a perfect grain). Therefore, the target 90 discriminated to be an acceptable product (a perfect grain) is guided to an acceptable product discharge gutter 574 without changing the falling trajectory thereof (indicated as a target 92 in FIG. 12).

The conveyance route of the target 90 may be changed by ejecting the air 563 toward the target 90 sliding on the chute 73, instead of the configuration that ejects the air 563 toward the target 90 after the target 90 falls from the chute 73. Further, a belt conveyor may be employed as the conveyance means instead of the chute 73. In this case, the air may be ejected toward the target falling from one end of the belt conveyor. Alternatively, the air may be ejected toward the target that is being conveyed on the belt conveyor.

According to the sorting apparatus 510 configured in this manner, the number of sortable types of defective products (the types of conditions of the target) can be increased. Alternatively, the condition of the target 90 can be confirmed in further detail by outputting the result of the discrimination made by the discrimination portion 81.

Having described embodiments of the present disclosure, the above-described embodiments are intended to only facilitate the understanding of the present teachings, and are not intended to limit the present invention thereto. The present invention can be modified or improved without departing from the spirit thereof, and the present invention includes equivalents thereof. Further, each of the elements described in the claims and the specification can be combined in any manner or omitted in any manner within a range that allows it to remain capable of solving at least a part of the above-described problems or bringing about at least a part of the above-described advantageous effects.

For example, the above-described flowchart is merely one example, and each processing procedure constituting the flowchart may be subjected to a change in the processing order therein and/or be changed to equivalent processing within a range that does not depart from the spirit of the present invention.

Alternatively, the lighting pattern of the light sources may be set in such a manner that only one of the reflection image and the transmission image is acquired.

Alternatively, a sorting apparatus may be formed by combining the measurement apparatus 310 (refer to FIG. 8) or the measurement apparatus 410 (refer to FIG. 10), and the sorting portion 560 (refer to FIG. 12).

Alternatively, any electromagnetic wave source may be set up instead of or in addition to the above-described various light sources. Examples of such an electromagnetic wave source can include a near-infrared light source and/or an X-ray source. In this case, with respect to at least two electromagnetic wave sources (irradiation sources) different from each other in at least one of the wavelength range of the electromagnetic wave emitted therefrom and the installation position thereof, among all electromagnetic wave sources, their irradiation periods may be set so as not to overlap each other and to occur alternately.

Alternatively, the function of the correction portion 83 can be realized independently of the above-described embodiments. In other words, the function of the correction portion 83 is widely applicable to a measurement apparatus or a sorting apparatus including an electromagnetic wave irradiation source that emits an electromagnetic wave in the first wavelength range and an electromagnetic wave in the second wavelength range different from the first wavelength range, and a sensor including an element sensitive to both the first wavelength range and the second wavelength range.

DESCRIPTION OF THE REFERENCE NUMERALS

10 measurement apparatus
20 first light source unit
21 front-side red light source
22 front-side green light source
23 front-side blue light source
24 front-side red light
25 front-side green light
26 front-side blue light
30 second light source unit
31 rear-side red light source
32 rear-side green light source
33 rear-side blue light source
34 rear-side red light
35 rear-side green light
36 rear-side blue light
51 first sensor
52 second sensor
71 storage tank
72 feeder
73 chute
74 discharge gutter
80 controller
81 discrimination portion
82 irradiation control portion
83 correction portion
84 reception portion
90, 91, 92 target
310 measurement apparatus
341 front-side near-infrared light source
342 rear-side near-infrared light source
441 front-side first near-infrared light source
442 front-side second near-infrared light source
443 rear-side first near-infrared light source
444 rear-side second near-infrared light source
510 sorting apparatus
560 sorting portion
561 nozzle
562 valve
563 air
574 acceptable product discharge gutter
575 defective product discharge gutter
T1, T2 non-irradiation period

What is claimed is:

1. A measurement apparatus for measuring a condition of a target, the measurement apparatus comprising:
a conveyance portion configured to convey the target;
an electromagnetic wave irradiation source configured to irradiate the target in transit due to an action of the conveyance portion with an electromagnetic wave;
a sensor configured to detect at least one of a reflected electromagnetic wave emitted from the electromagnetic wave irradiation source and reflected on the target and a transmitted electromagnetic wave emitted from the electromagnetic wave irradiation source and transmitted through the target;
a discrimination portion configured to discriminate the condition of the target based on a signal acquired by the sensor; and
an irradiation control portion configured to control the irradiation with the electromagnetic wave emitted from the electromagnetic wave irradiation source,
wherein the electromagnetic wave irradiation source includes a first irradiation source disposed on a first side with respect to a conveyance route of the target and configured to emit visible light and a second irradiation source disposed on a second side opposite from the first side and configured to emit visible light,
the irradiation control portion is configured to control the electromagnetic wave irradiation source in such a manner that a first irradiation period and a second irradiation period do not overlap each other and occur alternately, the first irradiation period being a period during which the first irradiation source emits the electromagnetic wave, the second irradiation period being a period during which the second irradiation source emits the electromagnetic wave, and the sensor includes a first sensor disposed on the first side and a second sensor disposed on the second side.

2. The measurement apparatus according to claim 1, wherein the irradiation control portion is configured to control the electromagnetic wave irradiation source in such a manner that a non-irradiation period, during which the electromagnetic wave is not emitted from the electromagnetic wave irradiation source, is interposed between the first irradiation period and the second irradiation period.

3. The measurement apparatus according to claim 1, wherein the electromagnetic wave irradiation source includes a third irradiation source and a fourth irradiation source configured to emit near-infrared light, the third irradiation source and the fourth irradiation source are different from each other in at least one of a wavelength range of the near-infrared light emitted therefrom and an installation position thereof, and the irradiation control portion is further configured to control the electromagnetic wave irradiation source in such a manner that a third irradiation period and a fourth irradiation period do not overlap each other and occur alternately, the third irradiation period being a period during which the third irradiation source emits the near-infrared light, the fourth irradiation period being a period during which the fourth irradiation source emits the near-infrared light.

4. The measurement apparatus according to claim 1, wherein at least one of the first irradiation source and the second irradiation source is configured to emit at least an electromagnetic wave in a first wavelength range and an electromagnetic wave in a second wavelength range different from the first wavelength range, the sensor includes an element sensitive to both the first wavelength range and the second wavelength range, the measurement apparatus includes a correction portion configured to make a correction for reducing an intensity of a signal acquired by the element, and the discrimination portion discriminates the condition of the target based on the intensity of the signal after the correction.

5. A sorting apparatus comprising:

the measurement apparatus according to claim 1; and a sorting portion configured to sort the target based on a result of the discrimination made by the discrimination portion.

6. The measurement apparatus according to claim 4, wherein the measurement apparatus includes a reception portion configured to receive a kind of the target that should be measured by the measurement apparatus, and the correction portion is configured to change a level of the correction according to the kind of the target received by the reception portion.

7. The measurement apparatus according to claim 4, wherein the correction portion is configured to change the level of the correction according to the intensity of the signal acquired by the element.

8. The measurement apparatus according to claim 4, wherein each of the first irradiation source and the second irradiation source is configured to emit green light.

9. The measurement apparatus according to claim 4, wherein each of the first irradiation source and the second irradiation source is configured to emit blue light.

10. The measurement apparatus according to claim 1, wherein the electromagnetic wave irradiation source includes a third irradiation source configured to emit near-infrared light, and the irradiation control portion is configured to control the electromagnetic wave irradiation source in such a manner that the first irradiation period, the second irradiation period, and a third irradiation period, during which the third irradiation source emits the near-infrared light, do not overlap each other.

11. The measurement apparatus according to claim 1, wherein the conveyance portion is in the form of a chute or a conveyor.

12. A sorting apparatus comprising:

the measurement apparatus according to claim 6; and a sorting portion configured to sort the target based on a result of the discrimination made by the discrimination portion.

13. A measurement apparatus for measuring a condition of a target, the measurement apparatus comprising:

a conveyance portion configured to convey the target;

an electromagnetic wave irradiation source configured to irradiate the target in transit due to an action of the conveyance portion with an electromagnetic wave;

a sensor configured to detect at least one of a reflected electromagnetic wave emitted from the electromagnetic wave irradiation source and reflected on the target and a transmitted electromagnetic wave emitted from the electromagnetic wave irradiation source and transmitted through the target;

a discrimination portion configured to discriminate the condition of the target based on a signal acquired by the sensor; and an irradiation control portion configured to control the irradiation with the electromagnetic wave emitted from the electromagnetic wave irradiation source, wherein the electromagnetic wave irradiation source includes a first irradiation source and a second irradiation source different from each other in at least one of a wavelength range of the electromagnetic wave emitted therefrom and an installation position thereof, the irradiation control portion is configured to control the electromagnetic wave irradiation source in such a manner that a first irradiation period and a second irradiation period do not overlap each other and occur alternately, the first irradiation period being a period during which the first irradiation source emits the electromagnetic wave, the second irradiation period being a period during which the second irradiation source emits the electromagnetic wave, at least one of the first irradiation source and the second irradiation source is configured to emit at least an electromagnetic wave in a first wavelength range and an electromagnetic wave in a second wavelength range different from the first wavelength range, the sensor includes an element sensitive to both the first wavelength range and the second wavelength range, the measurement apparatus includes a correction portion configured to make a correction for reducing an intensity of a signal acquired by the element, and a reception portion configured to receive a kind of the target that should be measured by the measurement apparatus, the discrimination portion discriminates the condition of the target based on the intensity of the signal after the correction, and the correction portion is configured to change a level of the correction according to the kind of the target received by the reception portion.

14. A measurement apparatus for measuring a condition of a target, the measurement apparatus comprising:

a conveyance portion configured to convey the target;

an electromagnetic wave irradiation source configured to irradiate the target in transit due to an action of the conveyance portion with an electromagnetic wave;

a sensor configured to detect at least one of a reflected electromagnetic wave emitted from the electromagnetic wave irradiation source and reflected on the target and a transmitted electromagnetic wave emitted from the electromagnetic wave irradiation source and transmitted through the target;

a discrimination portion configured to discriminate the condition of the target based on a signal acquired by the sensor; and an irradiation control portion configured to control the irradiation with the electromagnetic wave emitted from the electromagnetic wave irradiation source, wherein the electromagnetic wave irradiation source includes a first irradiation source and a second irradiation source different from each other in at least one of a wavelength range of the electromagnetic wave emitted therefrom and an installation position thereof, the irradiation control portion is configured to control the electromagnetic wave irradiation source in such a manner that a first irradiation period and a second irradiation period do not overlap each other and occur alternately, the first irradiation period being a period during which the first irradiation source emits the electromagnetic wave, the second irradiation period being a period during which the second irradiation source emits the electromagnetic wave, at least one of the first irradiation source and the second irradiation source is configured to emit at least an electromagnetic wave in a first wavelength range and an electromagnetic wave in a second wavelength range different from the first wavelength range, the sensor includes an element sensitive to both the first wavelength range and the second wavelength range, the measurement apparatus includes a correction portion configured to make a correction for reducing an intensity of a signal acquired by the element, and the discrimination portion discriminates the condition of the target based on the intensity of the signal after the correction, and the correction portion is configured to change the level of the correction according to the intensity of the signal acquired by the element.

\* \* \* \* \*